(12) United States Patent
Worrall et al.

(10) Patent No.: US 10,004,006 B2
(45) Date of Patent: Jun. 19, 2018

(54) SECONDARY BASE STATION BEARER CHANGE

(71) Applicant: Alcatel Lucent, Boulogne Billancourt (FR)

(72) Inventors: Chandrika Worrall, Swindon (GB); Sudeep Palat, Swindon (GB); Philippe Godin, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days. days.

(21) Appl. No.: 15/524,519

(22) PCT Filed: Oct. 13, 2015

(86) PCT No.: PCT/EP2015/073631
§ 371 (c)(1),
(2) Date: May 4, 2017

(87) PCT Pub. No.: WO2016/071082
PCT Pub. Date: May 12, 2016

(65) Prior Publication Data
US 2017/0325133 A1    Nov. 9, 2017

(30) Foreign Application Priority Data
Nov. 7, 2014  (EP) ..................... 14306791

(51) Int. Cl.
*H04W 36/00* (2009.01)
*H04W 36/18* (2009.01)

(52) U.S. Cl.
CPC ... *H04W 36/0027* (2013.01); *H04W 36/0055* (2013.01); *H04W 36/18* (2013.01)

(58) Field of Classification Search
CPC ............ H04W 36/0027; H04W 36/18; H04W 36/0055
(Continued)

(56) References Cited

U.S. PATENT DOCUMENTS 9,788,251 B2 * 10/2017 Koskinen .............. H04W 36/18
9,848,323 B2 * 12/2017 Xu ......................... H04W 12/04
(Continued)

FOREIGN PATENT DOCUMENTS

WO    WO 2013/143613 A1    10/2013
WO    WO 2014/112803 A1    7/2014

OTHER PUBLICATIONS

NTT Docomo, Inc., "Introduction of Dual Connectivity," 3rd Generation Partnership Project (3GPP), 3GPP TSG-RAN WG2 Meeting #88, R2-144660, 69 pages, XP050886261, San Francisco, USA, Nov. 17-21, 2014.
(Continued)

*Primary Examiner* — Amancio Gonzalez
(74) *Attorney, Agent, or Firm* — Fay Sharpe, LLP

(57) ABSTRACT

A secondary base station method, secondary base station, master base station method, master base station and computer program products are disclosed. The secondary base station method comprises: upon it being determined that the secondary base station is to perform a protocol layer re-establishment, permitting continued transmission of data packets to user equipment over the secondary base station bearer. In this way, service interruption can be minimized since pending data packets may continue to be transmitted while the re-establishment takes, which minimizes service interruption and reduces the number of data packets which will need to be retransmitted.

16 Claims, 2 Drawing Sheets

SeNB Modification procedure - SeNB initiated

(58) Field of Classification Search
USPC .......................................................... 455/436
See application file for complete search history.

(56) References Cited

U.S. PATENT DOCUMENTS

| | | | | |
|---|---|---|---|---|
| 9,860,797 | B2* | 1/2018 | Basu Mallick ... | H04W 36/0027 |
| 2014/0056243 | A1 | 2/2014 | Pelletier et al. | |
| 2015/0043492 | A1* | 2/2015 | Baek .................. | H04W 76/025 370/329 |
| 2015/0341829 | A1* | 11/2015 | Futaki .................. | H04W 36/28 370/331 |
| 2015/0350962 | A1* | 12/2015 | Futaki .................... | H04B 7/024 370/331 |
| 2016/0044639 | A1* | 2/2016 | Yi ........................ | H04L 47/624 370/329 |
| 2016/0212661 | A1* | 7/2016 | Basu Mallick ....... | H04L 1/1614 |
| 2016/0309375 | A1* | 10/2016 | Dai .................. | H04W 36/0038 |
| 2016/0316508 | A1* | 10/2016 | Hong .................... | H04W 28/08 |
| 2016/0366175 | A1* | 12/2016 | Basu Mallick ......... | H04L 63/06 |
| 2017/0013668 | A1* | 1/2017 | Chang .................. | H04W 76/36 |
| 2017/0215225 | A1* | 7/2017 | Yi ........................ | H04W 80/02 |

OTHER PUBLICATIONS

Samsung, "Introduction to Dual Connectivity," 3$^{rd}$ Generation Partnership Project (3GPP), 3GPP TSG-RAN2 Meeting #86, R2-142461, 54 pages, XP050818637, Seoul, South Korea, May 19-23, 2014.
International Search Report for PCT/EP2015/073631 dated Dec. 11, 2015.

* cited by examiner bearer release procedure in 1).

SeNB Modification procedure - SeNB initiated

SeNB release resulted in a bearer type change of the last
bearer in SeNB from split to MCG bearer SeNB change procedure - SeNB initiated

SECONDARY BASE STATION BEARER CHANGE

FIELD OF THE INVENTION

The present invention relates to a secondary base station method, secondary base station, master base station method, master base station and computer program products.

BACKGROUND

Wireless telecommunication systems are known. In such systems, network connectable devices known as user equipment (for example, mobile telephones or wireless devices such as iPads or other similar tablets) are operable to communicate with base stations provided by network providers.

In known wireless telecommunication systems, radio coverage is provided to network connectable devices within geographical areas, each known as a cell. A base station is located in each cell to provide radio coverage. Typically, network connectable devices in each cell are operable to receive information and data from a base station and to transmit information and data to a base station.

Network connectable devices roam through the wireless communication system. A number of base stations are typically provided and are distributed geographically in order to provide a wide area of coverage to network connectable devices.

If a network connectable device is within an area served by a base station, communications may be established between user equipment and the base station over associated radio links. Each base station typically supports a number of sectors or cells within the geographical area of radio coverage or service. Typically, a different antenna provided at a base station supports each associated sector or cell. Each base station often has multiple antennas.

Traditional base stations provide coverage in relatively large geographical areas and such cells are often referred to as macro cells.

In some cases, "dual connectivity" may be offered, such that a network connectable device is configured to allow communication with two base stations; a master base station and secondary base station. Those two base stations may, for example, comprise two macro cell base stations or a macro cell base station and a small cell base station. A number of dual connectivity implementations may be configured and each may offer different benefits.

Although dual connectivity deployments may offer advantages, unexpected consequences of such deployments may occur. It is desired to address those consequences.

SUMMARY

According to a first aspect, there is provided a secondary base station method, comprising: upon it being determined that the secondary base station is to perform a protocol layer re-establishment, permitting continued transmission of data packets to user equipment over the secondary base station bearer.

The first aspect recognizes that dual connectivity involves a user equipment connecting to a master base station (MeNB) and secondary base stations (SeNB) at the same time. From a Radio Resource Control (RRC) signalling over radio point of view, there are two main signalling procedures which control the configuration of bearers for the transmission of data packets to the user equipment when operating in dual connectivity. The first is an RRC parameter reconfiguration which does not involve the re-establishment of the layer 2 protocol stack in the secondary base station. The second is a secondary base station cell group (SCG) change procedure which requires the re-establishment of the layer 2 protocol stack at the secondary base station; the SCG-Packet Data Convergence Protocol (PDCP) layer is re-established, the SCG-Radio Link Control (RLC) layer is re-established, the SCG-Medium Access Control (MAC) is reset and the SCG-Physical layer (PHY) is released. The first aspect also recognizes that when a protocol layer re-establishment is required, the time taken to effect the change may be comparatively long due to non-ideal backhaul characteristics of the network interfaces, which may interrupt communication with the user equipment.

Accordingly, a method is provided. The method may be for a secondary base station. The method may comprise that upon or when it is determined, detected or established that the secondary base station is to re-establish protocol layers, transmission of any pending data packets may be continued over the secondary base station bearer. In this way, service interruption can be minimized since pending data packets may continue to be transmitted until the re-establishment takes place, which minimizes service interruption and reduces the number of data packets which will need to be retransmitted.

In one embodiment, the method comprises continuing transmission of data packets to user equipment over the secondary base station bearer.

In one embodiment, said protocol layer re-establishment is due to said secondary base station bearer being moved to another base station.

In one embodiment, said protocol layer re-establishment is due to layer 2 protocol layers of said secondary base station being re-established.

In one embodiment, the permitting comprises permitting continued transmission of data packets to user equipment over all secondary base station bearers of the secondary base station. Hence, transmission may continue over every bearer for that secondary base station.

In one embodiment, the permitting comprises permitting continued transmission until a trigger occurs which ceases transmission. Accordingly, when the trigger occurs, the continued transmission of the data packets may stop.

In one embodiment, the method comprises generating the trigger. Accordingly, the secondary base station may itself generate the trigger.

In one embodiment, the generating occurs in response to at least one of resources available to the secondary base station and bearer condition between the secondary base station and user equipment. Accordingly, the secondary base station may generate the trigger due to existing constraints on its resources, which it considers may be best allocated to a bearer which is not currently indicated as being about to be moved, or because the efficiency of the bearer about to be moved is low due to poor radio conditions.

In one embodiment, the trigger comprises a message received from a master base station. Accordingly, the master base station may indicate to the secondary base station that the continued transmission is to be stopped.

In one embodiment, the message triggers a period after which transmission is to cease. Accordingly, the stopping of the transmissions may occur after a defined period.

In one embodiment, the message comprises at least one of a secondary base station modification confirm message and a user equipment context release message. It will be appreciated that any suitable message may be used.

Embodiments also recognize that the SCG change procedure will likely result in data packet loss unless a mechanism is provided to prevent this. This is particularly the case because when the SCG change is performed, all bearers which are offloaded via the secondary base station are impacted due to the re-establishment of the entire SCG-PDCP, SCG-RLC and the re-set of the SCG-MAC. This is particularly problematic when operating in a split bearer dual connectivity mode, since this is an RLC-Acknowledgement Mode (AM) and lossless communication should be ensured for traffic mapped onto RLC-AM bearers. When a split bearer is reconfigured as a master base station cell group (MCG) bearer or moved to another secondary base station, data which has been sent to the secondary base station but not yet successfully delivered to the user equipment must be sent again. Hence, the master base station needs to know which packets were successfully delivered to the user equipment to know which data packets need to be retransmitted. Hence, embodiments recognize that a technique is required to prevent loss of traffic mapped onto a split bearer upon the SCG change or where a change in bearer type occurs from a split to a MCG bearer. Although techniques exist for assisting in the prevention of loss data packets, these rely on a PDCP status report from the user equipment. However, such a status report is optional and so cannot be relied upon. When the PDCP status report is not used, the network would need to retransmit the first unconfirmed in-sequence data packet. This confirmation is based on the RLC acknowledge mode acknowledgements. However, for the split bearer in the secondary base station, the master base station does not have any RLC acknowledge mode acknowledgment information from the secondary base station and so this approach is also not suitable for split bearers.

Accordingly, in one embodiment, the method comprises transmitting an indication of data packets successfully delivered to the user equipment over the secondary base station bearer until the transmission ceased. Hence, the master base station is provided with an indication from the secondary base station itself of those data packets which were successfully delivered to the user equipment.

In one embodiment, the method comprises transmitting an indication of data packets successfully delivered to the user equipment over each secondary base station bearer until the transmission on the secondary base station bearer ceased. Accordingly, the master base station will determine those data packets provided to the secondary base station which have not been successfully delivered.

In one embodiment, the indication indicates a last successfully delivered sequential data packet for that secondary base station bearer. This provides a particularly efficient technique for indicating those data packets which have been delivered and therefore which may not be delivered and need to be retransmitted.

In one embodiment, the indication indicates any successfully delivered subsequent non-sequential data packets for that secondary base station bearer.

In one embodiment, the indication is provided over a master base station-to-secondary base station interface. One such interface is the X2 interface.

In one embodiment, it is determined that the secondary base station is to perform the change in the secondary base station bearer in response to at least one of conditions being experienced by the secondary base station and a message received from a master base station.

According to a second aspect, there is provided a secondary base station, comprising: logic operable, upon it being determined that the secondary base station is to perform a protocol layer re-establishment, to permit continued transmission of data packets to user equipment over a secondary base station bearer.

In one embodiment, the logic is operable to continue transmission of data packets to user equipment over the secondary base station bearer.

In one embodiment, said protocol layer re-establishment is due to said secondary base station bearer being moved to another base station.

In one embodiment, said protocol layer re-establishment is due to layer 2 protocol layers of said secondary base station being re-established.

In one embodiment, the logic is operable to permit continued transmission of data packets to user equipment over all secondary base station bearers of the secondary base station.

In one embodiment, the logic is operable to permit continued transmission until a trigger occurs which ceases transmission.

In one embodiment, the logic is operable to generate the trigger.

In one embodiment, the logic is operable to generate the trigger in response to at least one of resources available to the secondary base station and bearer condition between the secondary base station and user equipment.

In one embodiment, the logic is operable to generate the trigger in response to a message received from a master base station.

In one embodiment, the message triggers a period after which transmission is to cease.

In one embodiment, the message comprises at least one of a secondary base station modification confirm message and a user equipment context release message.

In one embodiment, the logic is operable to transmit an indication of data packets successfully delivered to the user equipment over the secondary base station bearer until the transmission ceased.

In one embodiment, the logic is operable to transmit an indication of data packets successfully delivered to the user equipment over each secondary base station bearer until the transmission on the secondary base station bearer ceased.

In one embodiment, the indication indicates a last successfully delivered sequential data packet for that secondary base station bearer.

In one embodiment, the indication indicates any successfully delivered subsequent non-sequential data packets for that secondary base station bearer.

In one embodiment, the indication is provided over a master base station-to-secondary base station interface.

In one embodiment, the logic is operable to determine that the secondary base station is to perform the change in the secondary base station bearer in response to at least one of conditions being experienced by the secondary base station and a message received from a master base station.

According to a third aspect, there is provided a master base station method, comprising: upon it being determined that the secondary base station is to perform a protocol layer re-establishment, awaiting an indication of data packets successfully delivered to user equipment over a secondary base station bearer until transmission ceased.

In one embodiment, said protocol layer re-establishment is due to said secondary base station bearer being moved to another base station.

In one embodiment, said protocol layer re-establishment is due to layer 2 protocol layers of said secondary base station being re-established.

In one embodiment, the method comprises transmitting a message to the secondary base station to cause the secondary base station to cease transmission over the secondary base station bearer.

In one embodiment, the message triggers a period after which transmission is to cease.

In one embodiment, the message comprises at least one of a secondary base station modification confirm message and a user equipment context release message.

In one embodiment, the method comprises receiving an indication of data packets successfully delivered to the user equipment over the secondary base station until the transmission ceased.

In one embodiment, the indication indicates data packets successfully delivered to the user equipment over each secondary base station bearer until the transmission on the secondary base station bearer ceased.

In one embodiment, the indication indicates a last successfully delivered sequential data packet for that secondary base station bearer.

In one embodiment, the indication indicates any successfully delivered subsequent non-sequential data packets for that secondary base station bearer.

In one embodiment, the indication is provided over a master base station-to-secondary base station interface.

In one embodiment, the method comprises re-transmitting any undelivered data packets for delivery to the user equipment.

According to a fourth aspect, there is provided a master base station, comprising: logic operable, upon it being determined that the secondary base station is to perform a protocol layer re-establishment, to await an indication of data packets successfully delivered to user equipment over the secondary base station bearer until transmission ceased.

In one embodiment, said protocol layer re-establishment is due to said secondary base station bearer being moved to another base station.

In one embodiment, said protocol layer re-establishment is due to layer 2 protocol layers of said secondary base station being re-established.

In one embodiment, the logic is operable to transmit a message to the secondary base station to cause the secondary base station to cease transmission over the secondary base station bearer.

In one embodiment, the message triggers a period after which transmission is to cease.

In one embodiment, the message comprises at least one of a secondary base station modification confirm message and a user equipment context release message.

In one embodiment, the logic is operable to receive an indication of data packets successfully delivered to the user equipment over the secondary base station until the transmission ceased.

In one embodiment, the indication indicates data packets successfully delivered to the user equipment over each secondary base station bearer until the transmission on the secondary base station bearer ceased.

In one embodiment, the indication indicates a last successfully delivered sequential data packet for that secondary base station bearer.

In one embodiment, the indication indicates any successfully delivered subsequent non-sequential data packets for that secondary base station bearer.

In one embodiment, the indication is provided over a master base station-to-secondary base station interface.

In one embodiment, the logic is operable to re-transmitting any undelivered data packets for delivery to the user equipment.

According to a fifth aspect, there is provided a computer program product operable, when executed on a computer, to perform the method steps of the first or third aspects.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figure 1:
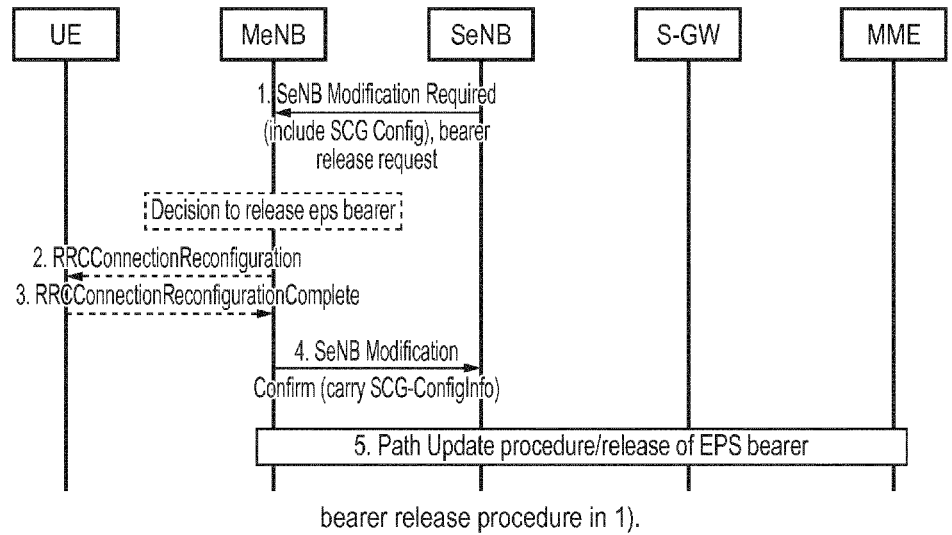
FIG. 1 illustrates a bearer release procedure.

Before discussing the embodiments in detail, first an overview will be provided. As mentioned above, networks which support dual connectivity can operate in an arrangement where both a master base station and a secondary base station support concurrent transmission of data packets to a single user equipment connected to those base stations in a dual connectivity mode.

In one arrangement, a single radio bearer is split after the PDCP layer within the master base station, with some of the data packets being provided through the lower layers of the master base station for transmission to the user equipment, and other data packets being provided over a master base station to secondary base station interface (typically the X2 interface), where the data packets are provided directly to the RLC layer of the secondary base station for transmission to the user equipment. This split bearer approach provides for increased resources for communication with the user equipment and so increases throughput. However, this split bearer approach also means that should there need to be a change to the secondary base station cell group bearers, then the layer 2 of the secondary base station needs to be re-established: the PDCP layer is re-established, the RLC layer is re-established, the MAC layer is reset and the physical layer is released.

For those SCG bearers which are split bearers, lossless communication needs to be ensured (i.e. no data packets should fail to be received by the user equipment). However, re-establishing the layer 2 in the secondary base station could lead to data packets which have not yet been successfully received by the user equipment when the re-establishment occurs being lost.

Accordingly, in embodiments, the secondary base station continues to transmit data packets it has received to the user equipment whilst it remains convenient to do so, despite a pending change to a secondary base station cell group bearer. This is because the change to the bearer may take some time to perform and so having the secondary base station continue to transmit data packets while it can helps to minimize any interruption to the user equipment.

Once the change to the secondary base station cell group occurs, the secondary base station may provide an indication of those data packets which have been successfully received by the user equipment. Typically, because the change affects all of the secondary base station cell group bearers, this indication is provided for each bearer.

The master base station then uses the information provided by the secondary base station in order to ensure that any data packets which were provided to the secondary base station and which were not delivered are made available for subsequent delivery to the user equipment to ensure lossless transmission.

Accordingly, in embodiments, an SCG change which involves a layer 2 re-establishment in the secondary base station may be initiated by either the master base station or the secondary base station. Many different reasons for performing the SCG change are possible, which include a primary serving cell change, a radio bearer type change, a security update, a synchronous parameter reconfiguration, a decision to re-establish layer 2 protocol layers, and the like. Depending on the cause or trigger for the SCG change, the secondary base station may continue communication with the user equipment over the radio interface even after the initiation of the SCG bearer change. This is in order to minimize the service interruption to the user equipment due to the SCG change, which is more frequent in dual connectivity operation.

A new trigger is introduced so that the secondary base station provides to the master base station over the X2 interface upon the SCG change, the latest transmission/reception status of, for example, PDCP protocol data units (PDUs) sent to and received by the user equipment. It will be appreciated that the user equipment typically provides an acknowledgment for each PDCP PDU successfully received by it. The master base station then uses the information provided by the secondary base station in support of lossless communication for all traffic delivered to the secondary base station prior to/upon the SCG change. It will be appreciated that this procedure can also be utilized when a split bearer is changed to an MCG bearer.

SCG Change

As mentioned above, many different events may cause a change to occur to a secondary base station bearer such as, for example, a primary secondary cell change, a data radio bearer type change, a security update, a synchronous parameter reconfiguration and a decision at the secondary base station to re-establish layer 2, each of which are realized with a secondary base station cell group change procedure. Even though there are different triggers for the secondary base station cell group change, a common procedure is applied.

Data Radio Bearer Type Change Procedures

Although the embodiments mentioned below are described in the context of a data radio bearer type change, it will be appreciated that similar techniques may be used for each of the said triggers mentioned above leading to the secondary base station cell group change.

Consider now a request from the secondary base station to release the secondary base station portion of the split bearer. With such a request, the master base station can perform any of the following procedures:

1. The master base station can release the corresponding Evolved Packet System (EPS) bearer;
2. If the secondary base station portion of the split bearer is not the last bearer for the user equipment in the secondary base station, the master base station may decide to change the bearer type from being a split bearer to a Master Cell Group (MCG) bearer;
3. If the secondary base station portion of the split bearer is the last bearer for the user equipment in the secondary base station, then the master base station may release the secondary base station and move the split bearer to the master cell group bearer;
4. If the secondary base station portion of the split bearer is the last bearer for the user equipment in the secondary base station, then the master base station may configure the bearer to another secondary base station, and so the secondary base station will change.

Procedure 1

FIG. 1 illustrates procedure 1 in more detail. After the secondary base station transmits the SeNB modification required with a bearer release request, the master base station decides to release the EPS bearer. Accordingly, the secondary base station can stop the delivery of the traffic on the bearer immediately. As the bearer is released, lossless delivery due to the SCG change is not a concern. Accordingly, the secondary base station can stop the user equipment communication on the bearer requested to be released at any time between step 1 and step 5 in FIG. 1. Because this procedure involves the release of the EPS bearer, it is likely that the secondary base station will stop communication on the bearer immediately.

Procedure 2

Figure 2:
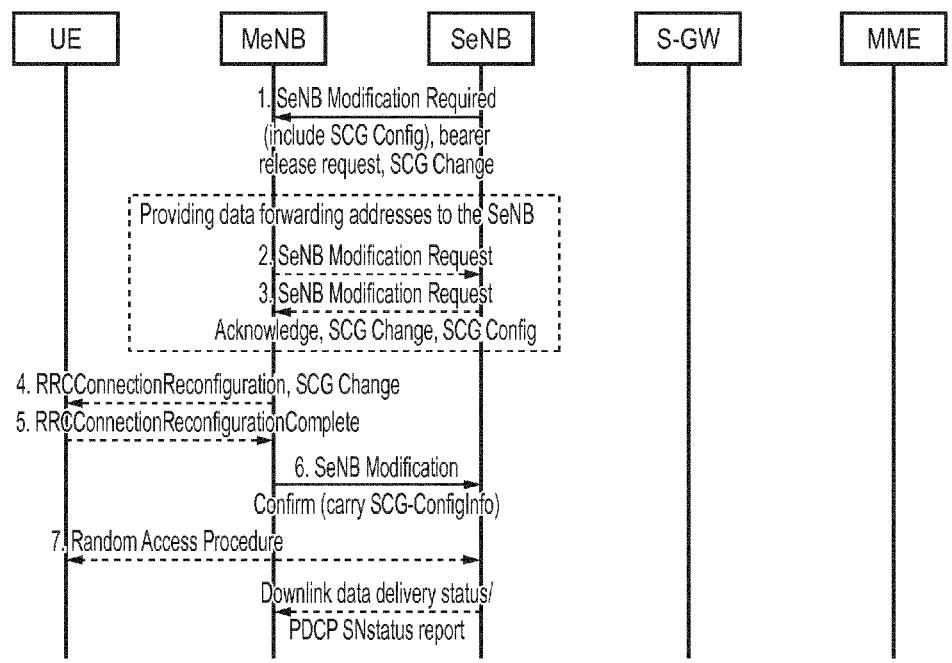
FIGS. 2 to 4 illustrate bearer type change procedure of embodiments.

FIG. 2 illustrates procedure 2 in more detail, where the master base station decides to change the bearer type from spit bearer to MGC bearer. Accordingly, the secondary base station can stop the user equipment communication on the bearer requested to be released or changed at any time between the update of SCG config including SCG change and the reception of the SeNB modification confirmed message and the random access procedure at steps 6 or 7. Typically, the user equipment communication on the bearer is stopped at the earliest of these events.

Procedure 3

Figure 3:
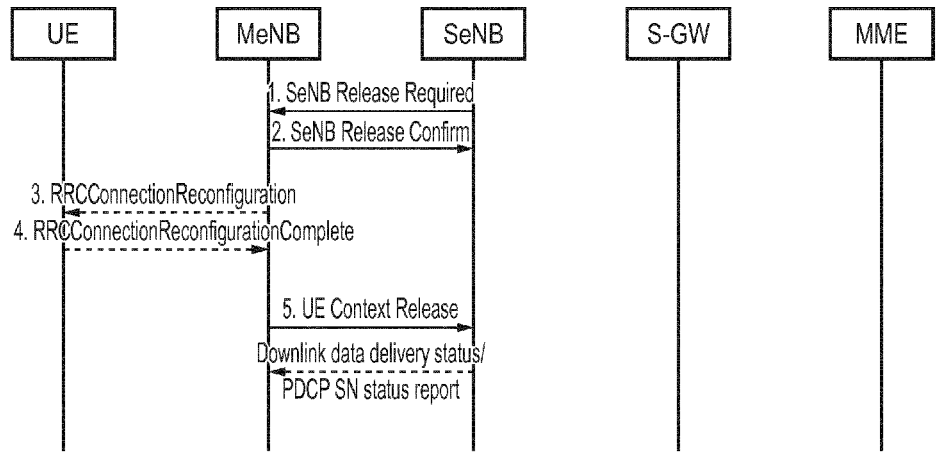

FIG. 3 illustrates procedure 3 in more detail. The secondary base station can stop the user equipment communication on the bearer requested to be released at any time between step 1 and step 5.

Procedure 4

Figure 4:
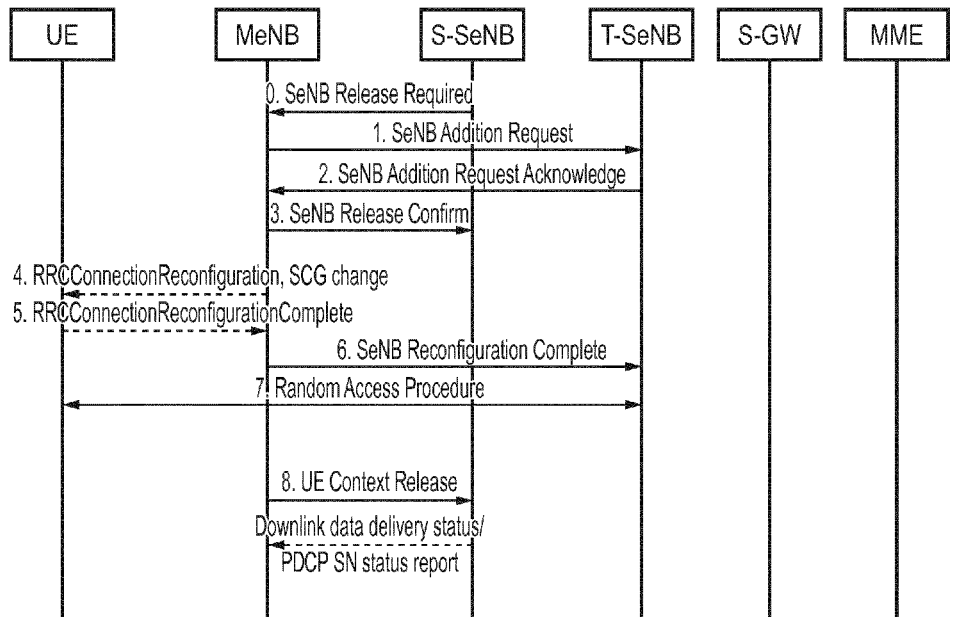

FIG. 4 illustrates procedure 4 in more detail. The secondary base station can stop the user equipment communication at any time between steps 0 and 8.

As can be seen, in each of these examples, a change occurs to the secondary base station bearer resulting in that bearer being moved to another base station. However, transmission of data packets may be continued for a period after it being determined that the change to the secondary base station bearer is required.

Delivery Feedback

For procedures 2, 3 and 4, lossless delivery of data packet needs to be guaranteed with the SCG change. Therefore, the secondary base station is required to provide the latest PDCP feedback indicating the delivery status of those packets by the secondary base stations (i.e. the secondary base station provides successfully delivered PDCP PDU information). The secondary base station (once it stops sending data to the user equipment) therefore sends a PDCP sequence number status report to the master base station. It will be appreciated that this can happen at any time after message 1 for procedures 2 and 3 and after message 0 for procedure 4.

The particular decision of when to stop transmitting data and when to provide the successful delivery information can vary from implementation to implementation and may even vary dependent on the conditions being experienced by the secondary base station, such as its load or the radio conditions on the bearer being changed. However, in one example implementation of procedure 2, when the secondary base station receives the SeNB modification request message at step 2 indicating an SCG change request from the master base station, the secondary base station provides the successfully delivered PDCP PDU information for all the bearers of the secondary base station at the time that the secondary base station stops transmission of the traffic to the user equipment for the affected bearer. Therefore, the SCG change indicator in step 2 can be used as an event trigger to provide the PDCP feedback information subsequently. However, in procedure 4, there is no differentiation to the old secondary base station indicating the master base station decision to change the secondary base station or to release the EPS bearer. The SCG change indicator should also be included in the SeNB release confirm message at step 3 informing the secondary base station by providing a trigger to provide the latest PDCP feedback information subsequently to enable the master base station to prevent data loss.

Hence, in summary, for procedures 2 and 4, when the SCG change is performed over the radio interface as a result of a bearer release request from the secondary base station or the master base station, the master base station indicates the decision for the SCG change to that secondary base station (which may have itself requested the bearer release). Upon the reception of the SCG change indicator, the secondary base station may continue with the user equipment communication on the bearer for as long as possible (as mentioned above, the duration is a matter of base station implementation) and the secondary base station generates the latest PDCP feedback indicating the transmission status of all the bearers of the secondary base station once the data communication to the user equipment is stopped.

The PDCP feedback status is generated per bearer served by the secondary base station. It will be appreciated that the data transmissions on different bearers can be stopped at the same or at different times. Thus, the PDCP feedback information is provided to the master base station per bearer at the same or at different times as triggered by the stopping of the data delivery.

Accordingly, embodiments provide a method for guaranteed lossless data delivery on split bearers when an SCG change is performed. This approach does not rely on the PDCP status delivery indicator from the user equipment which is an optional procedure. This helps to prevent possible data loss on the split bearer during an SCG change and also provides a mechanism for minimizing any duplicate transmissions.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A secondary base station method, comprising:
upon it being determined that said secondary base station is to perform a protocol layer re-establishment, permitting continued transmission of pending data packets to user equipment over a secondary base station bearer.

2. The method of claim 1, wherein said protocol layer re-establishment is due to said secondary base station bearer being moved to another base station.

3. The method of claim 1, wherein said protocol layer re-establishment is due to layer 2 protocol layers of said secondary base station being re-established.

4. The method of claim 1, wherein said permitting comprises permitting continued transmission of pending data packets to user equipment over all secondary base station bearers of said secondary base station.

5. The method of claim 1, wherein said permitting comprises permitting continued transmission until a trigger occurs which ceases transmission.

6. The method of claim 5, comprising generating said trigger.

7. The method of claim 5, wherein said trigger comprises a message received from a master base station.

8. The method of claim 1, comprising transmitting an indication of data packets successfully delivered to said user equipment over said secondary base station bearer until said transmission ceased.

9. The method of claim 1, comprising transmitting an indication of data packets successfully delivered to said user equipment over each secondary base station bearer until said transmission on said secondary base station bearer ceased.

10. The method of claim 8, wherein said indication indicates a last successfully delivered sequential data packet for that secondary base station bearer.

11. The method of claim 8, wherein said indication indicates any successfully delivered subsequent non-sequential data packets for that secondary base station bearer.

12. A secondary base station, comprising:
logic operable, upon it being determined that said secondary base station is to perform a protocol layer re-establishment, to permit continued transmission of pending data packets to user equipment over said secondary base station bearer.

13. A master base station method, comprising:
upon it being determined that a secondary base station is to perform a protocol layer re-establishment, awaiting an indication of data packets successfully delivered to user equipment over a secondary base station bearer until transmission ceased.

14. A master base station, comprising:
logic operable, upon it being determined that a secondary base station is to perform a protocol layer re-establishment, to await an indication of data packets successfully delivered to user equipment over a secondary base station bearer until transmission ceased.

15. A computer program product operable, when executed on a computer, to perform the method of claim 1.

16. A computer program product operable, when executed on a computer, to perform the method of claim 13.

* * * * *